United States Patent [19]

Morikawa et al.

[11] Patent Number: 6,045,840
[45] Date of Patent: Apr. 4, 2000

[54] PRODUCTION SYSTEM FOR BELT-FORM EDIBLE DOUGH AND THE METHOD OF USING THE SAME

[75] Inventors: Michio Morikawa; Koichi Hirabayashi; Kenji Takao, all of Utsunomiya, Japan

[73] Assignee: Rheon Automatic Machinery Co., Ltd., Tochigi Prefecture, Japan

[21] Appl. No.: 09/198,780

[22] Filed: Nov. 24, 1998

[30] Foreign Application Priority Data

Nov. 25, 1997 [JP] Japan .............................. P09-323490

[51] Int. Cl.[7] .............................. A21C 9/00; A21D 8/00
[52] U.S. Cl. .......................... 426/231; 425/135; 425/141; 425/147; 425/297; 425/363; 426/502; 426/503
[58] Field of Search ........................... 426/231, 502, 426/503, 517, 496; 425/363, 135, 141, 147, 297, 308, 311

[56] References Cited

U.S. PATENT DOCUMENTS 5,124,163   6/1992   Hayashi .................................. 426/517
5,204,123   4/1993   Hayashi .................................. 425/141
5,505,970   4/1996   Morikawa .............................. 426/231

FOREIGN PATENT DOCUMENTS 9-187213   7/1997   Japan .

Primary Examiner—George C. Yeung
Attorney, Agent, or Firm—Limbach & Limbach L.L.P.

[57] ABSTRACT

An apparatus for stabilizing the amount of belt-form edible dough produced per hour by a production system. The apparatus features a calculating device (67) to calculate the hourly throughput of the edible dough (W) by dividing the weight of the proper number of the divided edible dough bodies (W) by the time used to charge that proper number of the divided dough bodies (W). If by the calculation the hourly throughput of the edible dough is found to be below the predetermined goal, a controlling section (65) controls a motor (47) for gap-adjusting to expand the size of a gap for discharging between a pair of roller members (29L) and (29R). If the hourly throughput is found to be above the predetermined goal, the controlling section (65) controls the motor (47) to reduce the size of the gap for discharging.

10 Claims, 3 Drawing Sheets

PRODUCTION SYSTEM FOR BELT-FORM EDIBLE DOUGH AND THE METHOD OF USING THE SAME

BACKGROUND OF INVENTION

1. Field of Invention

This invention relates to a production system for belt-form edible dough that divides the edible dough and shapes it into a belt-form, and the method of using the system.

2. Prior Art

The production system of the prior art (e.g., U.S. Ser. No. 08/779,178) has a body frame as its base and provides a hopper for dividing to keep edible dough (e.g., dough for bread) inside. A dividing cutter device that cuts and divides edible dough is provided at the bottom opening of the hopper. A hopper for shaping in which the divided edible dough bodies are charged is disposed below the dividing cutter device. A level sensor that can switch to ON or OFF is disposed to detect whether the upper height limit of the edible dough charged into the hopper reaches the predetermined height within the hopper. A pair of shaping/conveying devices, which are V-shaped to squeeze the dough to be shaped into a belt-form and to convey it downwards, is disposed at the bottom opening of the hopper. A motor for conveying to drive the pair of shaping/conveying devices is disposed at a proper position. A conveyor to carry the belt-form edible dough is disposed below the pair of shaping/conveying devices.

The above production system also has a controlling section. When the upper limit level of the edible dough reaches the predetermined level within the hopper, the level sensor switches from OFF to ON. The controlling section responds to this switch to start the drive of the motor for conveying for shaping/conveying. When the level sensor switches from ON to OFF after the start, the controlling section responds to this to start the dividing cutter.

As above, after edible dough is placed in the hopper for the divider to be cut and divided by the dividing cutter device, the dough is charged into the hopper for shaping. By repeating the above cycle a plurality of times, the upper limit level of the edible dough reaches the predetermined level within the hopper for shaping. By this, the level sensor switches from OFF to ON. Then the controlling section responds to start the motor for conveying for shaping/conveying. This results in the pair of shaping/conveying devices squeezing the dough into a belt-form and conveying the belt-form edible dough downwards to discharge it onto the conveyor. The edible dough is then carried by the conveyor to the next production system.

When the edible dough is discharged through the gap for discharging, the upper limit level of the edible dough inside the hopper for shaping gradually becomes lower than the predetermined level. By this, the level sensor switches from ON to OFF. The controlling section responds to this to start the dividing cutter device to cut and divide the dough. Then the dough is charged into the hopper for shaping. Thereafter the edible dough is shaped into a belt-form and discharged onto the conveyor. This cycle is repeated whenever the level sensor switches from ON to OFF.

But to stabilize the hourly throughput of the belt-form edible dough was difficult by using the prior belt-form edible dough production system. When the hourly throughput of the edible dough varies, keeping a good condition of the dough is difficult and it results in the belt-form edible dough being inefficiently processed at the next stage of production.

SUMMARY OF THE INVENTION

In an aspect of this invention, a production system is provided that comprises a hopper for dividing for placing edible dough and a dividing cutter device that cuts and divides edible dough provided at the bottom opening of this hopper for dividing. An upper conveyor to carry the divided dough bodies downstream is disposed below the dividing cutter device. A hopper for shaping to hold the divided edible dough bodies is disposed below the downstream end of this upper conveyor. A level sensor that can switch to ON or OFF is disposed to detect whether the upper limit height of the edible dough that is charged into the hopper for shaping is up to the predetermined level within the hopper for shaping. A pair of shaping/conveying devices, which are V-shaped to squeeze the dough into a belt-form and to convey it downwards, is provided at the bottom opening of the hopper for shaping. A motor for conveying to drive the pair of shaping/conveying devices and an adjusting device to adjust the size of the gap for discharging (if one of the shaping/conveying devices is constituted to swing toward the other device about a pivot at the upper end, the size can be controlled to include the average size and the minimum size of the gap at the discharging end) between the pair of shaping/conveying devices, are disposed. A conveyor to carry the belt-form edible dough is disposed below the pair of shaping/conveying devices. A controlling section responds to start the drive of the motor for conveying for shaping/conveying when the level sensor switches from OFF to ON due to the upper limit level of the edible dough reaching the predetermined level within the hopper for shaping. A level sensor capable of switching to either ON or OFF is disposed. When the level sensor switches from ON to OFF, the divided edible dough bodies are brought into the hopper for shaping from the downstream end of the upper hopper after the start of the drive of the motor for conveying for shaping/conveying. A weight-detecting device is provided to successively detect each of the bodies of the divided dough dropped onto the upper conveyor. A timer is disposed to successively detect the time used for charging the divided edible dough bodies from the downstream end of the upper conveyor into the hopper for shaping. A calculating device is disposed to calculate the hourly throughput of the edible dough by dividing the weight of a proper number of divided edible dough bodies (one or more) by the time used for charging that proper number of divided edible dough bodies after the motor for conveying for shaping/conveying starts. The adjusting section is disposed to adjust the size of the gap for discharging between the pair of conveying and shaping devices to enlarge the size of the gap when the hourly throughput is below the predetermined amount and reducing it when the hourly throughput is above the predetermined amount.

In this invention, the divided edible dough bodies are dropped onto the conveyor after being cut and divided by the dividing cutter device. After the edible dough is carried by the upper conveyor toward the downstream end, it is dropped into the hopper for shaping from the downstream end of the upper conveyor. By repeating this cycle a plurality of times, the level sensor switches from OFF to ON due to the upper limit level of the edible dough inside the hopper for shaping reaching the predetermined level. Then the controlling section responds to this to start the motor for conveying for shaping/conveying. The pair of shaping/conveying devices squeezes the edible dough into a belt-form and discharges it through the gap for discharging onto the lower conveyor. The belt-form edible dough is carried by the lower conveyor to the next production section.

When the edible dough is discharged through the gap for discharging, the level sensor switches from ON to OFF due to the upper limit level of the dough inside the hopper for shaping becoming lower than the predetermined level. Then the divided edible dough bodies are charged into the hopper for shaping from the downstream end of the upper conveyor. Thereafter, the charged edible dough is shaped into a belt-form and conveyed onto the conveyor. This cycle is repeated whenever the level sensor switches from ON to OFF.

As above, in the process of charging the divided edible dough bodies, shaping the dough into a belt-form and conveying it onto the lower conveyor, the weight-detecting device successively detects the weight of each divided edible dough body, and the timer successively detects the time used to charge the divided edible dough bodies into the hopper for shaping. Then a calculating device calculates the hourly throughput of the edible dough by dividing the weight of a proper number of divided edible dough bodies by the time used for charging that proper number of divided edible dough bodies. Thereafter the adjusting device to adjust the size of the gap for discharging between the pair of shaping/conveying devices enlarges the size of the gap when the hourly throughput is below the predetermined amount and reduces it when the hourly throughput is above the predetermined amount.

In another aspect of this invention, it provides a method that comprises the following steps:

(i) A step to impel the divided edible dough bodies onto the upper conveyor by cutting and dividing the edible dough by the dividing cutter device, (ii) A step of conveying the divided dough bodies towards the conveying direction by the upper conveyor and charging the dough into the hopper for shaping after the step (i), (iii) A step of starting the motor for conveying by the controlling section when the sensor switches from OFF to ON due to the upper limit level of the charged dough inside the hopper for shaping reaching the predetermined level by repeating the steps of i) and ii).

(iv) A step to squeeze and shape the dough into a belt-form by the pair of shaping/conveying devices, and to convey the belt-form dough through the bottom gap between them onto the lower conveyor after finishing the step (iii).

(v) A step to charge the divided dough bodies into the hopper for shaping from the downstream end of the upper conveyor during the step (iv), when the level sensor that switches from ON to OFF due to the upper limit level of the dough being charged into the hopper for shaping becomes lower than the predetermined level.

(vi) A step to repeat the step (v) whenever the level sensor switches from ON to OFF.

(vii) A step, during the middle of the step (vi), to calculate the hourly throughput of the edible dough by dividing the weight of a proper number of divided edible dough bodies by the time used for charging that proper number of divided edible dough bodies by the calculating device, and to control the adjusting device by the controlling section to adjust the size of the gap for discharging between the pair of shaping/conveying devices, i.e., to enlarge the size of the gap when the hourly throughput is below the predetermined amount and reduce it when the hourly throughput is above the predetermined amount.

THE PREFERRED EMBODIMENTS OF THE INVENTION

Figure 1:
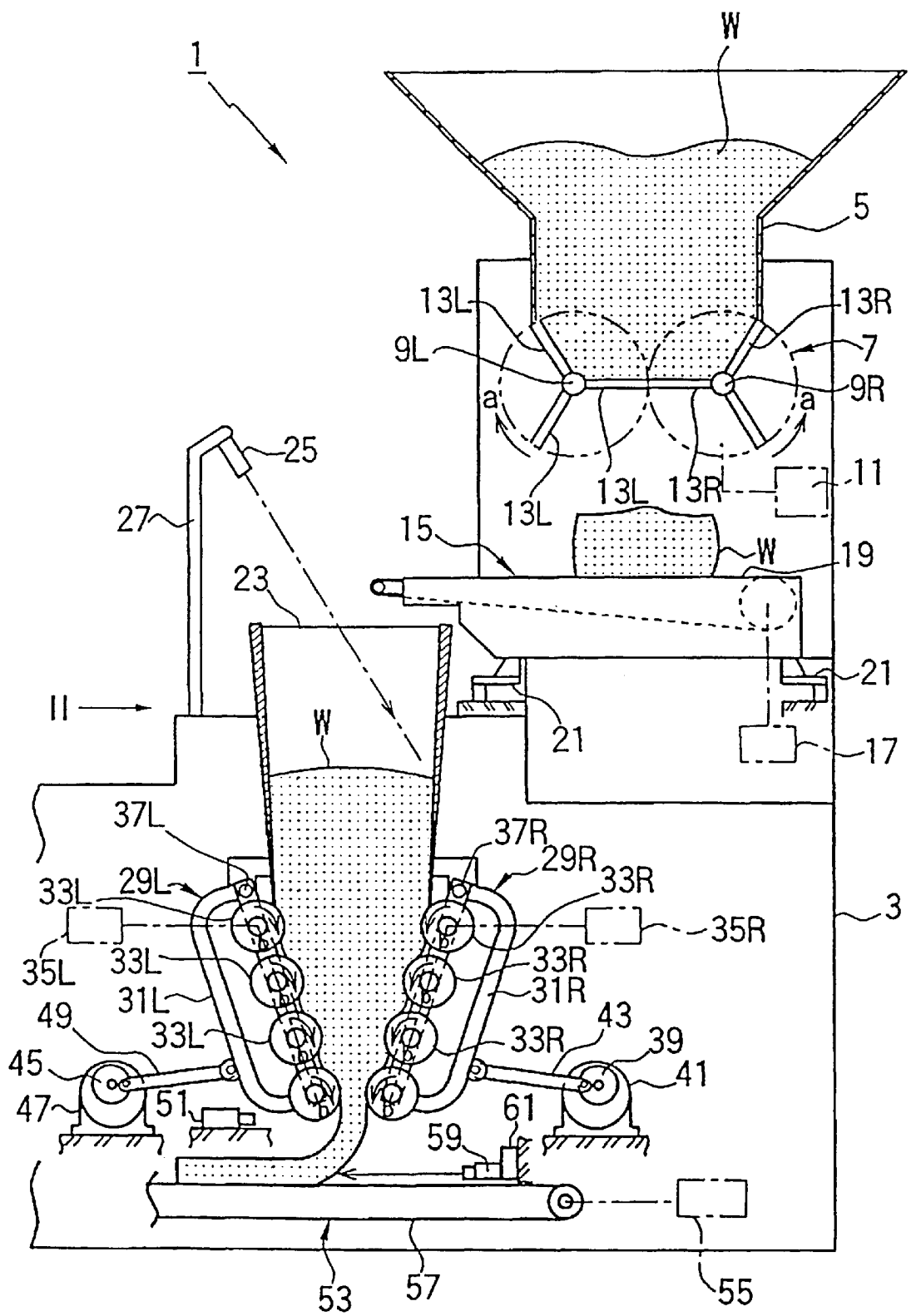
FIG. 1 is an outline front side view of the producing system for the belt-form edible dough.

From FIG. 1, clearly the preferred embodiment of this invention, i.e., the production system 1 of the belt-form edible dough that divides edible dough (e.g., dough for bread) W and shapes it into belt-form, has a body frame 3 as its base. A hopper 5 for dividing is disposed at the upper section of the body frame 3 (in the upper section of FIG. 1) and a dividing cutter device 7 to cut and divide the dough W is disposed at the bottom opening of the hopper 5 for the divider.

The dividing cutter device 7 is a device publicly known, as shown in U.S. Pat. No. 5,811,145. Briefly explained, it is as follows: a pair of rotatable rotating axes 9L and 9R are disposed near the bottom opening of the hopper 5 for the divider, and the pair of rotating axes 9L and 9R rotates simultaneously toward the conveying direction (in the direction of the arrow a of FIG. 1) by the drive of a motor 11 for a cutter. Each of the rotating axes 9L and 9R holds a plurality of cutters 13L and 13R, respectively. By the simultaneous rotation of the pair of rotating axes 9L and 9R, the matched ends of the pair of cutters 13L and 13R contact each other to cut the dough W and to shut the bottom opening of the hopper 5 for the divider.

An upper conveyor 15, which carries the divided dough bodies W, is disposed below the dividing cutter device 7. The upper conveyor 15 holds a belt 19 which is rotatable by the drive of a rotation motor 17. A load cell 21, to detect the weight of the divided edible dough bodies W, is properly disposed on the body frame 3 so as to support the upper conveyor 15.

Figure 2:
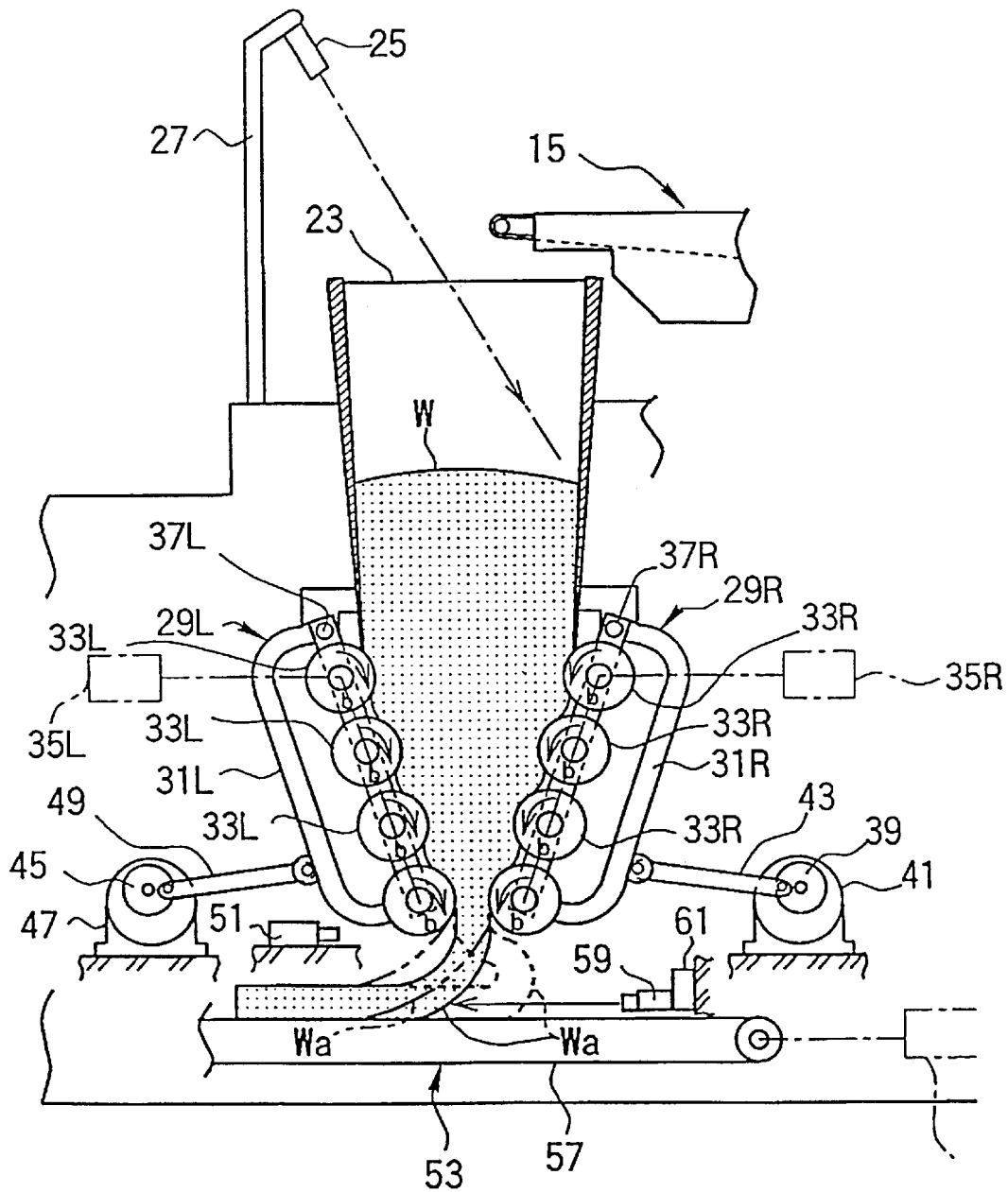
FIG. 2 is an enlarged view of the section indicated by the arrow "11" in FIG. 1.

As seen in FIGS. 1 and 2, a hopper 23 for shaping, into which the divided edible dough bodies are charged, is disposed below the downstream section of the upper conveyor 15 (seen in the left section of FIGS. 1 and 2). On the body frame 3, a level sensor 25 is disposed above the hopper 23 for shaping by a bracket 27. The level sensor 25 can switch from ON to OFF. It switches when it is detected that the limit height of the edible dough inside the hopper 23 has reached the predetermined level.

A pair of roller members 29L and 29R, i.e., which form a V-shape, are disposed at the lower opening section of the hopper 23 for shaping. The pair of roller members 29L and 29R squeeze to shape the edible dough into a belt-form, and to convey it downward. The roller member 29L holds a roller-supporting member 31L which is disposed on the left side of the lower opening section (seen in the left part of FIGS. 1 and 2), and a plurality of shaping/conveying rollers 33L are disposed side-by-side from the uppermost part to the lowermost part of the roller supporting member 31L. Similarly, the roller member 29R holds a roller-supporting member 31R disposed on the right side of the lower opening section, and a plurality of shaping/conveying rollers 33R are disposed side-by-side from the uppermost part to the lowermost part of the roller supporting member 31R. The plurality of shaping/conveying rollers 33L and 33R simultaneously rotate in the conveying direction (toward the arrow b in FIG. 1) by the drive of motors 35L and 35R for conveying respectively. Besides the circular shape as shown in FIG. 1, the cross-sectional shape of the shaping/conveying rollers 33L and 33R can by polygonal.

The right-side roller-supporting member 31R holds a swinging axis 37R as its swinging center. It can swing forward and away from the supporting member 31L to accelerate the discharge from the bottom gap between the pair of roller members 29L and 29R. To swing the roller-supporting member 31R, a discharge accelerating motor 41 that rotates a disk-shaped driving link 39 is properly positioned on the body frame 3. This driving link 39 and the roller-supporting member 31R are connected by the connecting link 43.

The left-side roller-supporting member 31L is constituted to hold a swinging axis 37R as its swinging center. It can swing forward and away from the roller-supporting member 31R to adjust the size of the bottom gap between the pair of roller members 29L and 29R. To adjust the swing of the roller-supporting member 31L, a motor 47 for gap-adjusting, which is similar to the servo motor that rotates a disk shaped driving link 45, is properly positioned on the body frame 3. This driving link 45 and the roller-supporting member 31L are connected by the connecting link 49. Further, a gap-detecting sensor (e.g., a potentiometer) 51, which detects the average size of the gap for discharging (or its minimum size) between the roller members 29L and 29R, is properly disposed on the body frame 3.

A lower conveyor 53, which carries the belt-form edible dough W, is disposed below the roller members 29L and 29R. This lower conveyor 53 holds a belt 57, which is caused to rotate by the drive of a running motor 55. A flow-amount detecting sensor 59 is disposed by the bracket 61 near the upstream part of the lower conveyor 53. This flow-amount detecting sensor 59 acts to detect a part of the dough W, i.e., the amount of dough flowing perpendicularly from the gap for discharging toward the lower conveyor 51 (the dough section Wa).

Figure 3:
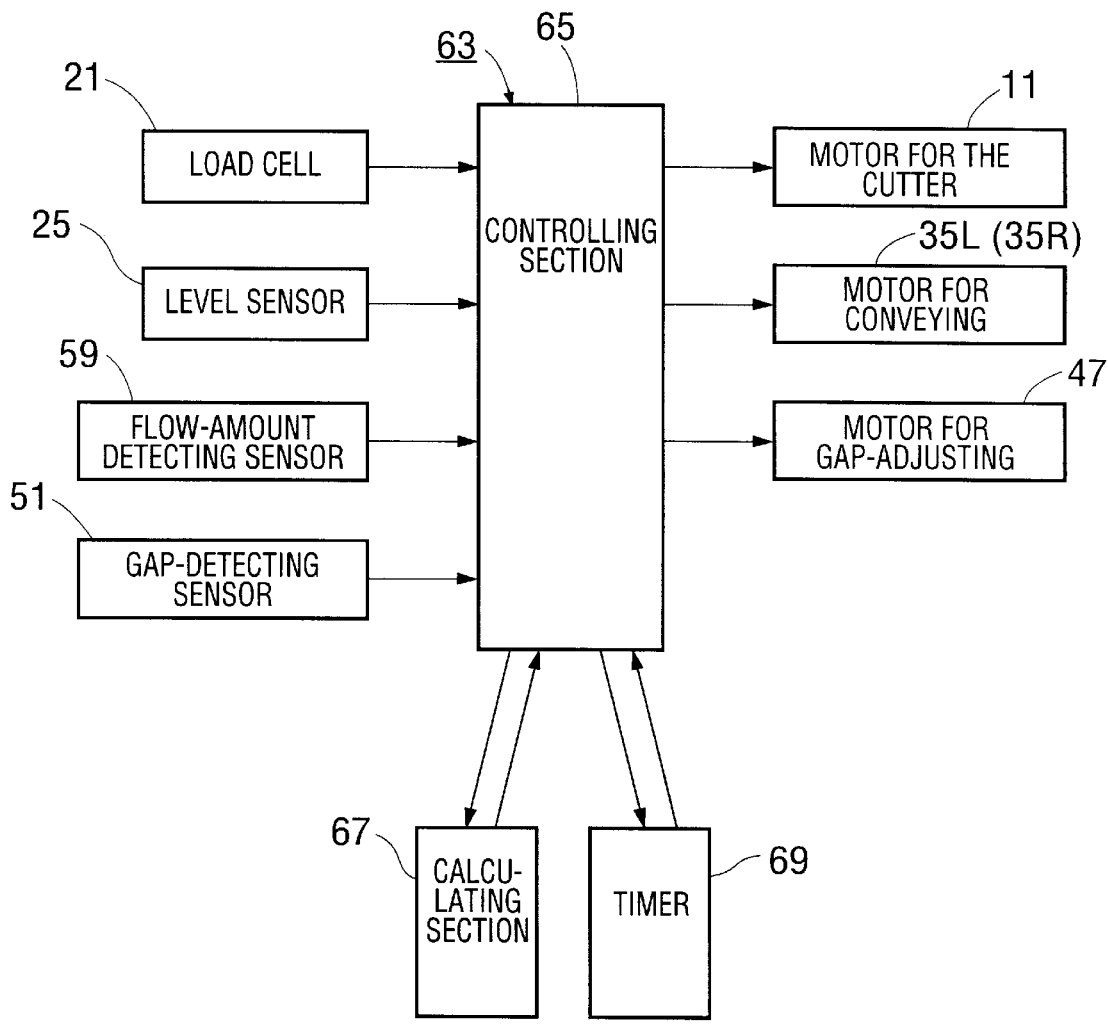
FIG. 3 is a block diagram of the controlling device.

In FIG. 3, a controlling device 63, which is part of the belt-form edible dough-producing device 1, which device is the preferred embodiment of this invention, is shown. This controlling device 63 holds a controlling section 65, a calculating section 67, and a timer 69. The controlling section 65 is connected to the sensors that are disposed (the load cell 21, the level sensor 25, a gap-detecting sensor 51, and a flow-amount detecting sensor 59) and the actuators that are disposed (the motor 11 for the cutter, the motors 35L and 35R for conveying, and the motor 47 for gap-adjusting).

The timer 69 is for successively detecting the time used to charge each divided dough body W (e.g., the time between the level sensor 25 to switch from ON to OFF to its next switching of ON to OFF) into the hopper 23 for shaping from the downstream section of the upper conveyor 15. The calculating device 67 calculates the hourly throughput of the edible dough W by dividing the weight of the proper number (in the preferred embodiment of this invention, three) of the divided edible dough bodies W by the time used to charge that proper number of the divided dough bodies W. When the level sensor switches from OFF to ON due to the upper limit level of the edible dough W reaching the predetermined level within the hopper 23 for shaping, the controlling section 65 acts to simultaneously start the rotation of the pair of motors 35R and 35L for conveying. After the pair of motors 35L and 35R for conveying start rotating and the level sensor switches from ON to OFF, the controlling section acts to start the actuation of the motor 11 for the cutter. Further, if the hourly throughput of the edible dough W is found to be below the predetermined goal, the controlling section 65 controls the motor 47 for gap-adjusting to expand the average size (or the minimum size) of the gap for discharging between the pair of roller members 29L and 29R. If the hourly throughput of the edible dough W is found to be above the predetermined goal, the controlling section 65 controls the motor 47 for gap-adjusting to reduce the average size (or the minimum size) of the gap for discharging between the pair of roller members 29L and 29R. If the dough section Wa of the edible dough flows mainly toward the downstream part of the lower conveyor 53 from the perpendicular direction (as in the dotted line of FIG. 2), the controlling section 65 controls the motors 35L and 35R for conveying to speed up the rotation of the plurality of shaping/conveying rollers 33L and 33R. If the dough section Wa of the edible dough bends toward the upstream part of the lower conveyor 53 from the perpendicular direction (as in the dotted line of FIG. 2), the controlling section 65 controls the motors 35L and 35R for conveying to speed up the rotation of the plurality of shaping/conveying rollers 33L and 33R.

The way to use the belt-form edible dough producing system and its effects are explained as follows:

Step (i)

By rotating the pair of rotating axes 9L and 9R toward the cutting direction after the edible dough W is charged into the hopper 5 for the divider, the edible dough W is cut and divided by the pair of matching cutters 13L and 13R. By this function, divided edible dough bodies W are impelled onto the upper conveyor 15.

Step (ii)

After the step (i) is finished, the upper conveyor 15 carries the divided edible dough bodies W toward the conveying direction and charges the dough into the hopper 23 for shaping from its downstream end.

Step (iii)

By repeating the steps of (i) and (ii), when the level sensor switches from OFF to ON due to the upper limit level of the edible dough W inside the hopper 23 for shaping reaching the predetermined level within the hopper, the controlling section 65 starts the drive of the motor 35L and 35R for conveying.

Step (iv)

After the step (iii) is finished, the pair of roller members 29L and 29R squeeze the edible dough W into a belt-form and discharge it through the gap for discharging onto the lower conveyor 53. The lower conveyor 53 carries the divided edible dough bodies W toward the conveying direction, to the next stage of production.

The right-side roller members 29R continuously swing forward and away from the left-side supporting roller members 29L a plurality of times by the drive of discharging accelerating motor 41. This is done while the edible dough W is discharged through the gap for discharging between the pair of roller members 29L and 29R. Swinging the right-side roller members 29R away from the left-side roller members 29L results in an upward pressure that decreases in the part of the dough at the upper sides of the gap. This accelerates the flow of the edible dough W into the gap due to its own weight. Swinging the right-side roller members 29R forward to the left-side roller members 29L results in the pair of roller members 29L and 29R shaping the edible dough W into a belt-form.

When the belt-form edible dough is discharged through the gap for discharging between the pair of roller members 29L and 29R, the flow-amount detecting sensor 59 detects the part of dough W that is the amount of dough flowing perpendicularly from the gap for discharging towards the lower conveyor 51. If most of the edible dough flows toward the downstream part of the lower conveyor 53 from the perpendicular direction, the controlling section 65 controls the motors 35L and 35R for conveying to speed up the rotation of the plurality of shaping/conveying rollers 33R and 33R. If the edible dough bends toward the upstream part of the lower conveyor 53 from the perpendicular direction, the controlling section 65 controls the motors 35L and 35R for conveying to slow the rotation of the plurality of shaping/conveying rollers 33L and 33R.

Step (v)

If the level sensor 25 switches from ON to OFF during the step (iv) due to the upper limit level of the edible dough W charged into the hopper 23 for shaping becoming lower than the predetermined level, the controlling section 65 actuates the motor 11 for the cutter to cut and divide the dough W by the matching pair of cutters 13L and 13R. The upper conveyor 15 carries the divided edible dough bodies W toward the conveying direction to charge it into the hopper 23 for shaping from the downstream end of the upper conveyor 15. As above, the charged dough W is shaped into the belt-form and conveyed onto the lower conveyor 53.

Step (vi)

Step (v) is repeated whenever the level sensor switches from ON to OFF.

Step (vii)

The calculating device 67 calculates the hourly throughput of the edible dough W by detecting the weight of the proper number (in the preferred embodiment of this invention, three) of the divided edible dough bodies W by the time used to charge that proper number of the divided dough bodies W into the shaping/conveying hopper 23 during the steps (iv), (v) and (vi). If the hourly throughput of the edible dough W is found to be below the predetermined goal, the controlling section 65 controls the motor 47 for gap-adjusting to expand the average size (or the minimum size) of the gap for discharging between the pair of roller members 29L and 29R.

According to this invention, the pair of roller members 29L and 29R that hold the plurality of shaping/conveying rollers 33L and 33R can be replaced by the pair of shaping/conveying belt devices that hold the belts extending from their uppermost parts to their lowermost parts and that can rotate in the conveying direction.

As above, during the charging, shaping, and conveying of the edible dough W of the preferred embodiment of the invention, if the hourly throughput of the edible dough W is found to be below the predetermined goal, the average size of the gap for discharging between the pair of roller members 29L and 29R is expanded. If the hourly throughput of the edible dough W is found to be above the predetermined goal, the average size of the gap for discharging between the pair of roller members 29L and 29R is reduced. By this, the hourly throughput of the belt-form edible dough W that is discharged is kept at a certain amount (the predetermined goal). The condition of the dough will be well-kept, and the belt-form edible dough will be efficiently disposed at the next stage of production.

Further, the discharging of the belt-form dough W will be accelerated. This will result in the efficient production of the belt-form dough W.

Furthermore, since for a long period most of the dough section Wa of the edible dough W will not flow toward the downstream part of the lower conveyor 53 from the perpendicular direction, the dough section Wa will not be separated. Therefore, the belt-form edible dough W will be continuously discharged. Further, since for a long period the dough section Wa of the edible dough will not bend toward the upstream part of the lower conveyor 53 from the perpendicular direction, the belt-form edible dough W will not accumulate between the lower conveyor 53 and the pair of roller members 29L and 29R. Therefore the obstruction of the discharging function of the belt-form dough W will be avoided.

We claim:

1. A production system for belt-form edible dough, comprising:

a hopper configured to receive edible dough;

a dividing cutter device provided at a bottom opening of the hopper, wherein the dividing cutter device is configured to cut and divide the edible dough, thereby forming divided dough bodies;

an upper conveyor configured to carry the divided dough bodies downstream, said upper conveyor being disposed below the dividing cutter device;

a shaping hopper configured to charge the divided edible dough bodies, said shaping hopper being disposed below a downstream end of the upper conveyor;

a level sensor that can switch to ON or OFF and is configured to detect whether an upper height limit of the edible dough charged into the shaping hopper reaches a predetermined level within the shaping hopper;

a pair of shaping/conveying devices that are V-shaped to shape the dough into a belt-form and to convey it downward, said shaping/conveying devices being disposed at a bottom opening of the shaping hopper;

a motor configured to drive the pair of shaping/conveying devices;

an adjusting device to adjust the size of a gap for discharging between the pair of shaping/conveying devices;

a second conveyor configured to carry the belt-form edible dough, said second conveyor being disposed below the pair of shaping/conveying devices;

a controlling section coupled to the motor and configured to start the drive of the motor when the level sensor switches from OFF to ON due to the upper height limit of the edible dough reaching the predetermined level within the shaping hopper, and to control the charging of the divided edible dough bodies into the shaping hopper from the downstream end of the hopper when the level sensor switches from ON to OFF after the motor is started;

a weight-detected device to successively detect each of the divided dough bodies dropped onto the upper conveyor;

a timer to successively detect the time used for charging the divided edible dough bodies from the downstream part of the upper conveyor into the shaping hopper; and a calculating device to calculate the throughput of edible dough by dividing the weight of a number of divided edible dough bodies by the time used for charging said number of divided edible dough bodies after the start of the motor, wherein the adjusting device is configured to increase the size of the gap when the throughput is below a predetermined amount and to reduce the size of the gap when the throughput is above the predetermined amount.

2. The apparatus of claim 1, in which the shaping/conveying devices are constituted of a pair of roller members holding a plurality of rollers disposed side-by-side from their uppermost rollers to their lowermost rollers, featuring each roller being capable of rotating in the direction the dough is conveyed.

3. The apparatus of claim 2, in which the pair of roller members holds at least one of its upper ends as an axis to swing forward and away from the other member to accelerate the discharge from the bottom gap between the two members.

4. The apparatus of claim 2, further comprising:
a second motor configured to simultaneously rotate the plurality of rollers of the pair of roller members; and
a flow-amount detecting sensor configured to detect the amount of belt-form edible dough that is discharged perpendicularly from the gap toward the second conveyor, and wherein the controlling section is configured to control the second motor to increase the rotating speed of the rollers when the dough is detected to be mainly carried toward a downstream part of the second conveyor as the dough flows away from the gap, and to slow the rotating speed when the dough is detected to be bent toward an upstream part of the second conveyor as the dough flows away from the gap.

5. The apparatus of claim 1, in which the shaping/conveying devices are constituted by a pair of shaping/conveying belts rotatable toward the direction the dough is conveyed, the belts extending from the uppermost part to the lowermost part of those devices, and having at least one of the upper ends of the devices as an axis that can swing forward and away from the other belt to accelerate the discharge from the bottom gap between the two belts.

6. The apparatus of claim 1, in which the controlling section actuates the dividing cutter device when the level sensor switches from ON to OFF after the start of the motor for conveying.

7. A method of using a production system for belt-form edible dough, wherein the system comprises a hopper configured to receive edible dough, a dividing cutter device provided at a bottom opening of the hopper, wherein the dividing cutter device is configured to cut and divide the edible dough, thereby forming divided dough bodies, an upper conveyor configured to carry the divided dough bodies downstream, a shaping hopper configured to charge the divided edible dough bodies, said shaping hopper being disposed below a downstream end of the upper conveyor, a level sensor configured to detect whether an upper height limit of the edible dough charged into the shaping hopper reaches a predetermined level within the shaping hopper, a pair of shaping/conveying devices configured to shape the dough into a belt-form and to convey it downward, said shaping/conveying devices being disposed at a bottom opening of the shaping hopper, a motor configured to drive the shaping/conveying devices, an adjusting device to adjust the size of a gap between the shaping/conveying devices, a second conveyor configured to carry the belt-form edible dough, said second conveyor being disposed below the shaping/conveying devices, a weight-detecting device to successively detect each of the divided dough bodies dropped onto the upper conveyor, a timer to successively detect the time used for charging the divided edible dough bodies from the upper conveyor into the shaping hopper, and a calculating device configured to calculate the throughput of the edible dough, wherein the adjusting device is configured to increase the size of the gap when the throughput is below a predetermined amount and to reduce the size of the gap when the throughput is above the predetermined amount, said method comprising the steps of:

(i) impelling the divided edible dough bodies onto the upper conveyor by cutting and dividing the edible dough using the dividing cutter device;

(ii) conveying the divided dough bodies toward a conveying direction using the upper conveyor and charging the edible dough bodies into the shaping hopper from its downstream end after the step (i) is finished;

(iii) starting the motor when the sensor detects that the upper limit level of the charged dough inside the hopper reaches the predetermined level;

(iv) squeezing and shaping the dough into a belt-form using the shaping/conveying devices, and conveying the belt-form dough through the gap onto a lower conveyor after the step (iii) is finished;

(v) charging the divided dough bodies into the shaping hopper from the downstream end of the upper conveyor during the step (iv), when the level sensor detects that the upper limit level of the dough charged into the shaping hopper is lower than the predetermined level;

(vi) calculating the throughput of the edible dough using the calculating device, and controlling the adjusting device to enlarge the gap when the throughput is below a predetermined amount and reduce the size of the gap when the throughput is above the predetermined amount.

8. The apparatus of claim 3, further comprising:
a second motor configured to simultaneously rotate the plurality of rollers of the pair of roller members; and
a flow-amount detecting sensor configured to detect the amount of belt-form edible dough that is discharged perpendicularly from the gap toward the second conveyor, and wherein the controlling section is configured to control the second motor to increase the rotating speed of the rollers when the dough is detected to be mainly carried toward a downstream part of the second conveyor as the dough flows away from the gap, and to slow the rotating speed when the dough is detected to be bent toward an upstream part of the second conveyor as the dough flows away from the gap.

9. The apparatus of claim 2, in which the controlling section is configured to actuate the dividing cutter device when the level sensor switches from ON to OFF after the start of the motor.

10. The apparatus of claim 5, in which the controlling section is configured to actuate the dividing cutter device when the level sensor switches from ON to OFF after the start of the motor.

* * * * *